United States Patent [19]
Ide et al.

[11] Patent Number: 5,776,525
[45] Date of Patent: Jul. 7, 1998

[54] CONTINUOUS PROCESS FOR PRODUCING HIGH PROTEIN FOODSTUFF AND AN APPARATUS USEFUL THEREIN

[75] Inventors: Takeo Ide, Saitama-ken; Yasunobu Hiraoka, Hannou; Shoichi Koizumi; Minoru Morita, both of Kawagoe; Kunio Ueda, Yamanashi-ken, all of Japan

[73] Assignee: Snow Brand Milk Products Co., Ltd., Hokkaido, Japan

[21] Appl. No.: 709,490

[22] Filed: Sep. 6, 1996

[30] Foreign Application Priority Data

Sep. 7, 1995 [JP] Japan .................... 7-229886

[51] Int. Cl.$^6$ ............... A23C 9/12; A23C 19/02; A23C 3/02
[52] U.S. Cl. ............... 426/36; 426/34; 426/39; 426/40; 426/582; 99/453; 99/483; 99/517
[58] Field of Search ............... 426/34, 36, 39, 426/40, 656, 582, 491, 522, 580; 99/324, 325, 342, 353, 452, 466, 486, 453, 454, 455, 483, 517

[56] References Cited
U.S. PATENT DOCUMENTS

| | | | |
|---|---|---|---|
| 3,592,124 | 7/1971 | Pontecorvo et al. | 99/243 |
| 3,713,220 | 1/1973 | Kielsmeier et al. | 99/459 |
| 4,091,721 | 5/1978 | Cosmi | 99/453 |
| 4,536,147 | 8/1985 | Groff | 425/323 |
| 4,760,937 | 8/1988 | Evezich | 222/95 |
| 4,948,599 | 8/1990 | Sagara et al. | 426/40 |
| 5,334,398 | 8/1994 | Sueyasu et al. | 426/36 |
| 5,445,062 | 8/1995 | Polster | 99/348 |

*Primary Examiner*—W. Gary Jones
*Assistant Examiner*—Debra Shoemaker
*Attorney, Agent, or Firm*—Griffin, Butler Whisenhunt & Szipl

[57] ABSTRACT

A process and an apparatus for continuously and efficiently producing high protein foodstuff such as cheese curd, by continuously sprinkling and pouring a protein solution such as cow's milk or soybean milk from above onto the water surface of a warm water bath through a nozzle having multiple holes. A constant amount of warm water kept at a fixed temperature is supplied to the water bath. This process converts the protein solution into curd useful in producing various types of cheese.

6 Claims, 3 Drawing Sheets

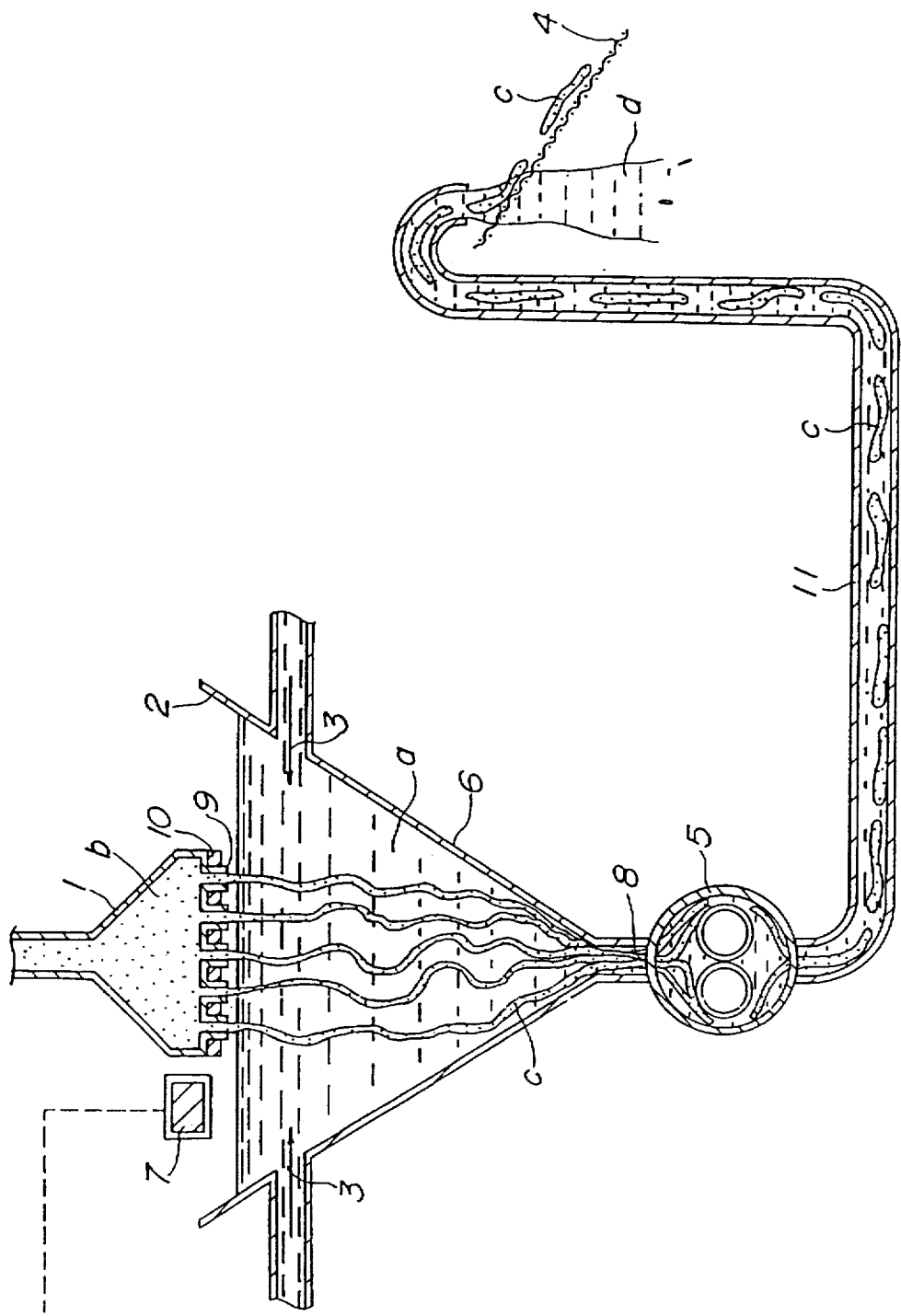

5,776,525

CONTINUOUS PROCESS FOR PRODUCING HIGH PROTEIN FOODSTUFF AND AN APPARATUS USEFUL THEREIN

FIELD OF THE INVENTION

This invention relates to the production of high protein foodstuffs such as cheese curd from protein solutions such as cow's milk or soybean milk.

BACKGROUND OF THE INVENTION

The present invention relates to a process and an apparatus for producing high protein foodstuff (hereinafter denoted by the term "curd"), useful in producing various types of cheese. This apparatus allows continuous production of curd in a short time using a protein solution such as concentrated milk, soybean milk or the like with possibilities of improving productivity and eliminating the steps and time consumed for both acid generation by lactic acid bacteria as the starter, and also causing the congealing reaction by a milk clotting enzyme which has been hitherto regarded as indispensable in the production of curd.

In the production process of cheese, curd is usually prepared from raw material milk by adding lactic acid bacteria as the starter and a milk clotting enzyme for clotting, but there exist problems that a large scale installation is required in the case of mass production and that the efficiency is low due to the long duration of processing time because of the batch mode production process. In addition, there is the problem that special technical skills and strict schedule controlling of the curd preparation are required in response to the type of cheese in order to maintain product quality. Accordingly, there are some proposals on tentative preparation of curd in a continuous mode or in a time saving process in which a protein solution with a solid content preliminarily increased by processing raw material milk using an ultrafiltration membrane or the like is used.

For example, the process of using milk processed by an ultrafiltration membrane has been originally tried in France and, in this process, cheese curd is prepared by concentrating the raw material milk through a treatment with an ultrafiltration membrane and, to this concentrated milk, lactic acid bacteria as the starter and a milk clotting enzyme are added (cf. French Patent Laid-Open Publication No. 2052121).

Further, a disclosure has been also made on a continuous method of small batch preparation of cheese curd in which lactic acid bacteria as the starter and a milk clotting enzyme are added to a protein solution which has been processed with an ultrafiltration membrane, and this compounded protein solution is poured into a plural number of vessels for successive clotting and discharge (cf. Japanese Patent Laid-Open Publication 1984/501932).

Moreover, a method has been also disclosed on the preparation of cheese curd in which an acid such as hydrochloric acid, phosphoric acid, acetic acid or the like is directly added to raw material milk intended for shortening of time and diminution of the devices needed for preparation of cheese curd (cf. Japanese Patent Examined Publication No. 1973/37829).

As mentioned above, various improvements have been made on the process for preparing cheese curd in a continuous mode or in a short time.

However, the process disclosed in the above French Patent Laid-Open Publication No. 2052121 is inefficient because the process is far from achieving the object of saving time or continuous operation, though there is the possibility of being regarded as effective to some extent in respect of diminution of device since the protein solution is converted into curd by clotting basically with the use of lactic acid bacteria as the starter and a milk clotting enzyme.

Also, the method disclosed in Japanese Patent Examined Publication No. 1973/37829 is inappropriate for the process of continuous production of cheese curd due to the necessity of heating in a state of still standing, though there is the possibility of saving time to some extent as compared with the case of curd preparation by using lactic acid bacteria as the starter and a milk clotting enzyme, since an acid is added to a raw material milk of 40% or less of the solid content which is then stirred while being kept at a constant temperature with subsequent heating in a state of still standing for generation of curd.

Still more, the process disclosed in Japanese Patent Laid-Open Publication No. 1984/501932 cannot be regarded as being a time saving process or an essentially continuous process because it is nothing but merely a modification of the batch mode production to a continuous practice by using lactic acid bacteria as the starter and a milk clotting enzyme for generation of curd similarly to the process disclosed in the above French Patent Laid-Open Publication No. 2052121.

In view of the inefficiency in the hitherto tried processes for continuous preparation of cheese curd in a short time as described above, the applicant has previously disclosed a process for preparation of cheese curd in which instantaneous temperature elevation is applied to milk concentrated with an ultrafiltration membrane and adjusted to pH 5.0–6.0 for clotting without addition of any milk clotting enzyme (cf. Japanese Patent Laid-Open Publication No. 1988/98350). In this process, a protein solution is clotted to be converted into curd by being mixed with warm water for instantaneous temperature elevation after addition of lactic acid bacteria as the starter and an organic acid such as lactic acid, citric acid or the like. This method has an effect of enabling efficient preparation of cheese curd without the need of time for reaction (culture) of lactic acid bacteria as the starter and time for action of the milk clotting enzyme which have been hitherto regarded as indispensable in the cases of cheese curd preparation.

SUMMARY OF THE INVENTION

The inventors have carried out studies on practical application of the process for preparing cheese curd described in the above Japanese Patent Laid-Open Publication No. 1988/98350, reaching the conclusion that curd can be continuously prepared with high efficiency by sprinkling and pouring of a protein solution into a warm water bath to which a constant amount of warm water kept at a fixed temperature is supplied, thus completing the present invention.

Accordingly, the object of the present invention is to provide a process for continuous production of curd as well as an apparatus useful therein.

The above-described disadvantages of prior art methods are overcome by the present invention.

That is to say, the object of the present invention is a process for continuous production of curd, characterized in that curd is produced by continuously sprinkling and pouring a protein solution into a warm water bath to which a constant amount of warm water kept at a fixed temperature is supplied from above the water surface. Further, the object of the present invention is a process for continuous production of curd in which the temperature of the warm water supplied is kept at 45°–95° C. and at the same time a protein solution is sprinkled and poured into the warm water after being regulated to a temperature of 10° C. or below and pH 4.8–5.8.

Another object of the present invention is an apparatus for continuous production of curd to be used in the above-mentioned process in which a warm water bath is supplied with a constant amount of warm water kept at a fixed temperature and a nozzle for sprinkling and pouring a protein solution is disposed at a location in the vicinity of liquid surface in the warm water bath. In such an apparatus, the nozzle is partitioned in a state of multiple holes for sprinkling and pouring a protein solution in the shape of thin membranes or in the shape of strings. The warm water bath of the apparatus is equipped with a plural number of feeding ports for supplying warm water from the peripheral zone toward the central zone, the warm water serving for clotting of the protein solution sprinkled and poured from the above-mentioned nozzle in order to be converted into curd, and is equipped with a discharge port for discharging the curd and warm water.

In addition, the apparatus may be equipped with a liquid level sensor for measuring the level of the water surface in the warm water bath and with a controlling device to control, utilizing the value obtained from the sensor, the discharge amount of the curd and warm water by discharge means located at the discharge port. Thereby, the end of the nozzle for sprinkling and pouring the protein solution is located 1–5 cm above the water surface of the warm water bath, and there is provided a cooling means or insulating means in the surroundings of the discharge port of the nozzle.

BRIEF DESCRIPTION OF THE DRAWINGS

FIG. 3 is an explanatory drawing showing a curd-preparing unit in the apparatus of the present invention.

Figure 1:
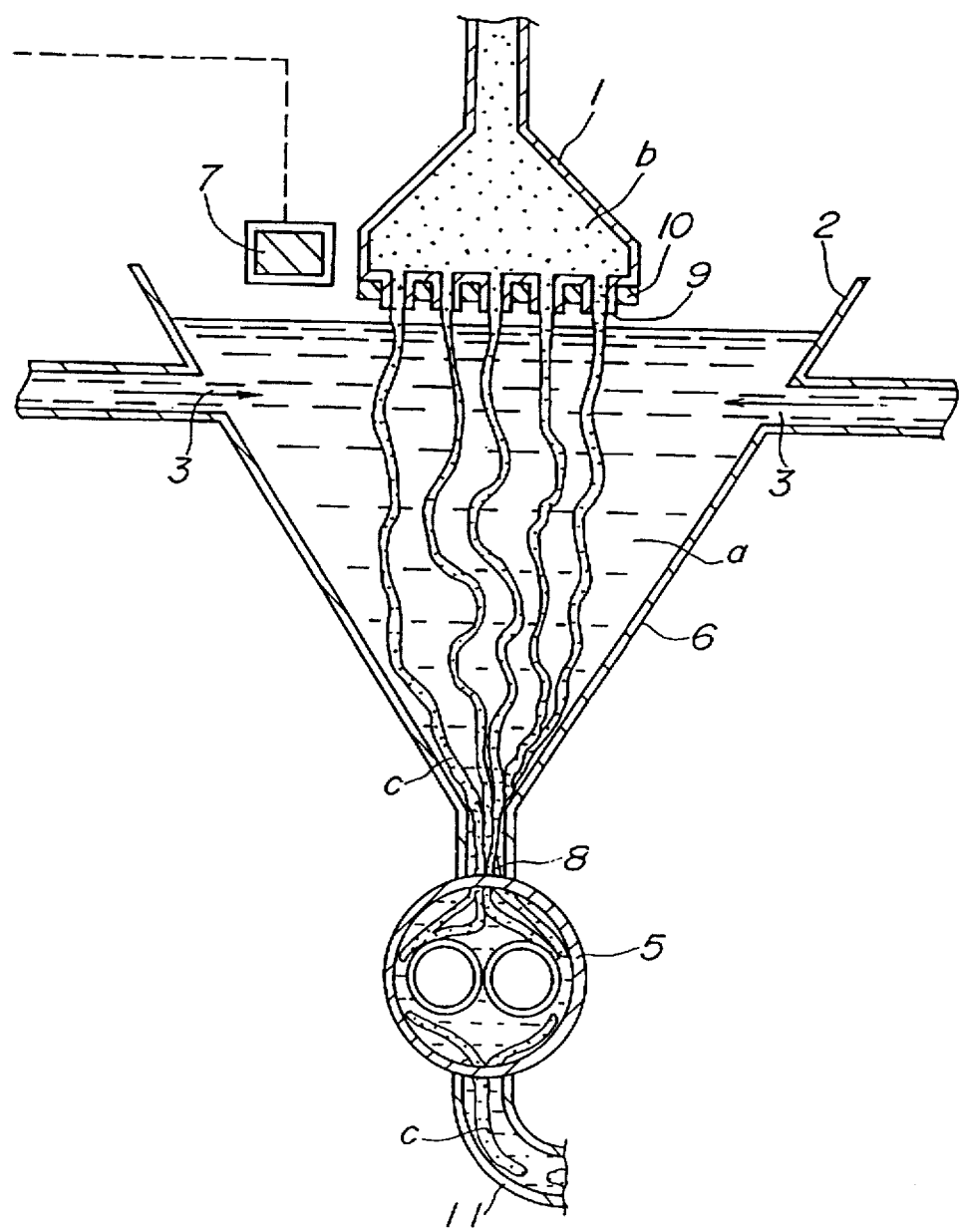
FIG. 1 is an explanatory drawing showing the relation between a warm water bath and a nozzle for sprinkling and pouring a protein solution in the apparatus of the present invention.

In these figures, numeral 1 indicates a sprinkling/pouring nozzle, 2 indicates a warm water bath, 3 indicates a water supply port, 4 indicates a mesh plate, 5 indicates a metering pump, 6 indicates a slant bottom 7 indicates a liquid level sensor, 8 and 9 indicate a discharge port, 10 indicates a insulating layer, 11 indicates a excurrent pipe, notation a indicates warm water, b indicates a protein solution, c indicates curd and d indicates discharged warm water.

DETAILED DESCRIPTION OF THE PREFERRED EMBODIMENT

Hereinafter the present invention is explained in detail.

The protein solution used in the present invention should be concentrated milk or soybean milk or the like. In the case of concentrated milk, a protein solution with about 2–6 fold of the concentrating rate is prepared by processing of a raw material milk such as cow's milk, goat's milk, water-buffalo's milk or the like, using an ultrafiltration membrane having at largest 500,000 Da of fractionated molecular weight, or a precision filtering membrane with at largest 0.3 μm of the pore size or the like. Further, in the case of using soybean milk, soybean is ground with added water with subsequent filtering to prepare soybean milk of high concentration. Then, after cooling to a temperature of 10° C. or below, the pH of these protein solution is adjusted to 4.8–5.8 by adding an organic acid such as lactic acid, citric acid, acetic acid or the like or gluconodeltalactone (G.D.L.). The protein solution having been cooled and subjected to pH-adjustment in the above manner is continuously sprinkled and poured into a warm water bath which is supplied with a constant amount of warm water kept at a fixed temperature from above the water surface in the warm water bath to cause instantaneous clotting for conversion into curd.

The warm water to be used for curd preparation from this protein solution should be continuously supplied to the warm water bath while being kept at a temperature in the range of 45°–95° C. in a constant amount which is at least the amount equal to that of the sprinkled and poured-protein solution. Since the temperature of the warm water is not lowered by the protein solution mixed, owing to continuous introduction of warm water into the warm water bath in the above manner, it is possible to avoid the problem of poor generation of curd and a wide variation in the quality, resulting in continually obtaining curd having a uniform quality.

The warm water should preferably be supplied in a specific manner that the warm water is gently introduced from the feeding port for warm water disposed on the periphery of the warm water bath toward the central zone of the warm water bath. It is possible to suppress inducing of turbulent flow or agitation owing to introduction of warm water with a leveled pressure from the feeding ports for warm water equipped in plurality each of which is arranged oppositely to another directed toward the central zone.

Accordingly, the curd is not disaggregated to fineness at the time of sprinkling and pouring of the protein solution into warm water to make the water flow resemble a natural flow so that it is possible to improve the collecting rate at the time of curd collecting mentioned afterward.

Additionally, the pH of the above protein solution is adjusted to the range of 4.8–5.8 on the ground of a technical reason that there is a problem of restricted scope of using the curd in the case in which the pH is lower than 4.8 due to the excessively sour taste of the obtained curd. On the other hand, there is also a problem that the protein solution does not clot in warm water or that curd generation is time consuming in the case in which the pH exceeds 5.8. Further, the temperature of warm water is limited to the range of 45°–95° C. because of problems that the protein solution cannot be converted into curd at a temperature lower than 45° C. due to the low temperature, and that it is difficult to control the temperature of warm water to a constant level in the case in which the temperature exceeds 95° C.

Further, it is preferable to sprinkle and pour the protein solution into the warm water in the warm water bath from above the surface of the warm water;. with a space of about 1–5 cm. This is because the protein solution tends to coagulate by the radiant heat from the warm water. In particular, in the case in which the protein solution is sprinkled and poured into warm water in the shape of thin membranes or strings using a nozzle in which the discharge port is partitioned in multiple holes, it is preferable to dispose the open end of the discharge port with a space of about 1–5 cm from the surface of warm water, simultaneous cooling the surroundings of the discharge port with cooling means or heat-insulator in order to prevent coagulation of the protein solution in the nozzle (clogging of nozzle) due to the radiant heat from the warm water as mentioned above.

After conversion of the protein solution into curd by sprinkling and pouring into warm water as mentioned above, the curd is collected while being discharged with warm water through the discharge port positioned at the lower portion of the warm water bath. In this step of curd collection, the curd is collected by being discharged by way of an excurrent pipe while keeping the balance of warm water introduced from the feeding port for warm water and the protein solution sprinkled and poured from the nozzle. A metering pump is arranged at the lower part of the warm water bath with subsequent isolation from the warm water by a mesh plate such as a wire gauze, a punching metal or the Like arranged at the outlet of the excurrent pipe.

In the practical application of the process and the apparatus for production of curd according to the present invention, it is possible to obtain advantages, not only the high efficiency owing to curd production carried out in a short time and in a continuous mode, but also the applicability of the obtained curd in a broad scope of production of various types of cheese.

EXAMPLES

The process and the apparatus for production of curd according to the present invention are specifically explained below with drawings but the invention should not be restricted thereto.

Example 1

The apparatus for production of curd according to the present invention is composed of, as illustrated in FIG. 1, a nozzle (1) for sprinkling and pouring the protein solution (b) and a warm water bath (2) installed so as that the surface of warm water (a) is positioned directly beneath and approaching the nozzle. The warm water bath (2) is constituted of a feeding port (3) for introducing warm water (a), a discharge port (8) for discharging the curd (c) formed by clotting and warm water (a) and a metering pump (5) for discharging a constant amount of curd (c) and warm water (a) through the discharge port (8).

Figure 2:
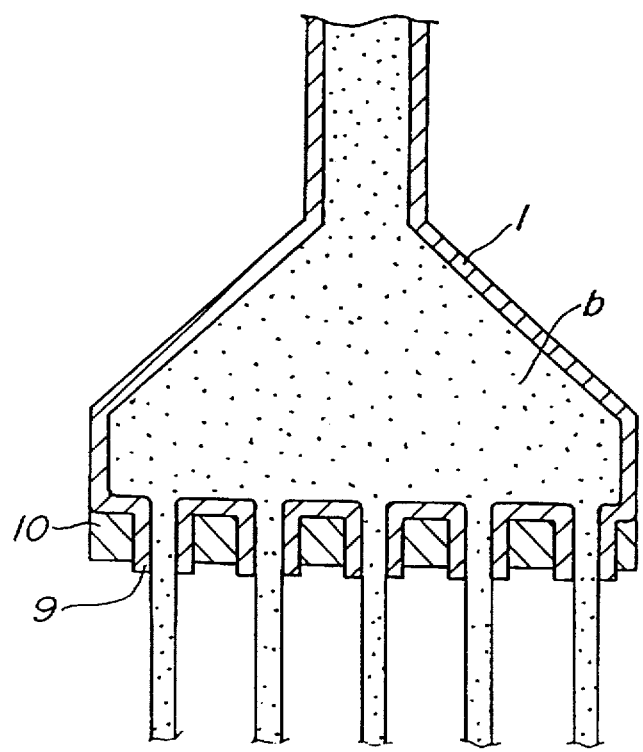
FIG. 2 is a cross-sectional view showing the nozzle used for sprinkling and pouring the protein solution in the apparatus of the present invention.

The discharge port (9) positioned at the lower end of the nozzle (1) used for sprinkling and pouring the protein solution (b) illustrated in FIG. 2 is formed in the state of multiple holes (in this example, the number of holes is 80), and the periphery of flowing pass of the protein solution (b) is surrounded by a cooling layer with a cooling medium or a heat insulating layer (10) so that the protein solution (b) is protected against coagulation in the inside of the nozzle (1) caused by temperature elevation due to the radiated heat from the warm water (a). In the case of temperature elevation of the protein solution (b) in the warm water (a), it is essential that the time required for the temperature elevation should be as short as possible. Therefore, the discharge port (9) of the nozzle (1) is given with a form of multiple holes. That is to say, since the protein solution (b) is diluted by the warm water (a) before beginning of clotting in the cases of low rate of temperature elevation to induce some problems such as, for example, poor clotting and disaggregation of the curd in fine particles, the nozzle (1) of this invention for sprinkling and pouring the protein solution is given with a discharge port in the form of multiple holes as an arrangement of a large number of holes having a small diameter thereby to expand the contacting area between the sprinkled and poured protein solution (b) and the warm water (a) for enhancing the rate of heat-exchange.

The warm water (a) for clotting of the protein solution (b) sprinkled and poured from the above nozzle (1) to convert it into curd is supplied through a plural number of feeding ports (3) horizontally arranged on the periphery of the warm water bath (2) (in this example, 4 feeding ports are disposed each interposing a central angle of 90°). The respective feeding ports (3) for warm water are connected with a reserve tank for warm water (not shown in the drawings) and the warm water is supplied from the reserve tank for warm water and gently introduced toward the central zone with an equal pressure. Further, since the feeding ports (3) for warm water are located opposite each other, the flow of the introduced warm water (a) is buffered in the central zone to avert causing drift current or agitation. Such conditions intend to prevent fine disaggregation of the generated curd by drift current, agitation or the like caused at the time of curd generation.

In addition, a discharge port (8) is located in the lower part of the warm water bath (2) at the center zone thereof as a downward extrusion in continuation to the slant bottom (6) of the warm water bath (2), and the curd can be continuously discharged at a fixed rate with the warm water (a) through the discharge port (8) which is equipped with a metering pump (5).

In consideration of the relationship between the locations of the nozzle (1) for sprinkling and pouring the protein solution (b) and the warm water bath (2), it can be seen that the nozzle (1) is positioned on the upward extension of the center line of the warm water bath (2) so as to locate the end (9) of discharge port in a state of multiple holes of the nozzle (1) upwardly about 1–5 cm apart from the surface of warm water (a) in the warm water bath (2). Such relationship is to intend prevention of coagulation of the protein solution (b) in the nozzle (1) (clogging of nozzle) by the radiated heat from the warm water (a). Further, the distance between the discharge port (9) of the above nozzle (1) and the surface of warm water (a) can be kept constant by controlling the discharge amount from the metering pump (5) installed around the discharge port (8) of the warm water bath (2) on the basis of the surface level of the warm water (a) detected by using a liquid level sensor (7) of, e.g., ultrasonic type or electrostatic capacity type and regulated by the action of a feedback controlling system.

After the above-mentioned conversion of the protein solution (b) into curd by the warm water (a), the curd (c) is quantitatively discharged with the warm water (a) by way of the excurrent pipe (11) by the action of metering pump (5) around the lower part of the warm water bath (2). The warm water (d) and the curd (c) discharged from the excurrent pipe (11) are, as shown in FIG. 3, separated by the mesh plate (4) such as a wire gauze, a punching metal or the like fitted to the discharge port of the excurrent pipe (11) and the curd (c) is gathered by the mesh plate (4).

Example 2

Cow's milk was concentrated to 4-fold concentration (solid content 20%) using an ultrafiltering membrane (manufactured by Koch) having 8,000 Da of the fractionated molecular weight. The pH of this protein solution was adjusted to 5.5 by adding citric acid while being stirred and kept at 10° C. by cooling.

Separately, warm water kept at 80° C. was supplied at the rate of 300 l/minute from the feeding ports using a warm water bath of circular form equipped with four feeding ports for warm water arranged on the periphery thereof interposing each a 90° central angle. The nozzle for sprinkling and pouring the protein solution (the holes had each 0.1 cm$^2$ of the cross-sectional area and the number of holes was 80) was set above the surface of the warm water so as that the ends of discharge ports were positioned upwardly 1 cm apart from the surface of warm water, and the protein solution prepared as above was continuously sprinkled and poured from this nozzle into the warm water in a state of strings at the rate of 150 l/minute in the warm water. The protein solution sprinkled and poured into this warm water was instantaneously clotted to be converted into curd. This curd was discharged with warm water from the discharge port arranged at the lower part of the warm water bath using the metering pump and separated from the warm water by the mesh plate, fitted to the outlet of the excurrent pipe, to be collected. This curd was used as a raw material of cheese verifying that the obtained cheese is indistinctive from the cheese with use of any curd prepared using lactic acid bacteria as the starter and a milk clotting enzyme.

Example 3

Soybean of 100 kg was ground with 500 kg of added water with subsequent pressurizing-heating at 110° C. for 10 minutes to be cooled and further filtered giving 560 kg of soybean milk. The pH of this soybean milk was adjusted to 5.8 by adding acetic acid while being stirred after cooling to 10° C.

Separately, warm water kept at 80° C. was supplied at the rate of 300 l/minute from the feeding port using a warm water bath of circular form equipped with four feeding ports for warm water arranged on the periphery thereof interposing each a 90° central angle. The nozzle for sprinkling and pouring soybean milk (the holes had each 0.1 cm² of the cross-sectional area and the number of holes was 80) was set above the surface of the warm water so as that the ends of discharge ports were positioned upwardly 1 cm apart from the surface, and the soybean milk prepared as above was continuously sprinkled and poured from this nozzle into the warm water in a state of strings at the rate of 150 l/minute. The soybean milk sprinkled and poured into this warm water was instantaneously clotted to be converted into curd. This curd was discharged with the warm water from the discharge port arranged at the lower part of the warm water bath using the metering pump, and separated from the warm water by the mesh plate, fitted to the outlet of the excurrent pipe, to be collected. This curd was converted into a cheese-like food by adding casein, an edible fatty oil (a mixture of soybean oil and butter), phosphate salt, sodium chloride, an edible emulsifier and a cheese flavor. The obtained cheese-like food exhibited dietary feeling and flavor similar to those of cheese-like foods of prior art.

Since preparation of the curd is carried out by clotting of a protein solution continuously sprinkled and poured into warm water kept at a fixed temperature and supplied in a constant amount, the present invention provides an effect that curd can be continuously produced steadily with uniform quality by avoiding problems of fluctuation of the quality or poor generation of curd derived from variation of the temperature of warm water.

Further, it has been made possible to easily produce curd usable for various types of cheese in a short time since the process of the present invention requires no reaction (culture) time for lactic acid bacteria and no action time for the milk clotting enzyme which have been hitherto regarded as indispensable for preparation of curd in cheese production in cheese production of prior art.

In addition, there are problems that the protein solution cannot be clotted and converted into curd because of the low temperature in the case in which the temperature of the warm water is lower than 45° C., and also because there is difficulty in controlling the temperature of the warm water at a fixed temperature in the case in which the temperature exceeds 95° C. However, according to the embodiment of the present invention, protein solutions can be converted with certainty into curd and the temperature of the warm water can be controlled without difficultly.

Moreover, there are problems that the scope of using the curd is restricted in the case in which the pH value of the protein solution is lower than 4.8 due to the excessively intensive sour taste of the obtained curd, and that the protein solution cannot be clotted in warm water or the step of curd formation is time consuming in the case in which the pH value exceeds 5.8. However according to the embodiment of the present invention, such problems have been solved.

Still more, the present invention provides, in the embodiments thereof, an effect that the protein solution is not clotted in the nozzle (so called clogging of nozzle) by the radiated heat from the warm water, enabling continuous curd production in a short time with high efficiency. This is because the warm water is gently introduced from the feeding ports for warm water arranged on the periphery of the warm water bath toward the central zone of the warm water bath, and the protein solution is sprinkled and poured in the warm water using a nozzle having a discharge port partitioned in a state of multiple holes and positioned above the surface of warm water.

Such conditions verify that the present invention is a practically useful technology since the step of cheese curd production which has hitherto relied solely upon manual operation can be automated so that uniform quality and cost reduction of cheese as the final product can be easily attained.

What is claimed is:

1. A continuous process for producing cheese curd characterized by continuously sprinkling and pouring a condensed milk, regulated 10° C. or below and to a pH in the range 4.8–5.8, from a nozzle equipped with a discharge port having multiple holes so as to sprinkle and pour the condensed milk in a shape of thin membranes or strings into a warm water bath from above the water surface whereby said condensed milk is converted into curd, continuously removing said curd and a portion of the water in said water bath from said water bath, and continuously supplying to said water bath, in an amount equal to the portion of the water removed therefrom, warm water kept at a fixed temperature of 45°–95° C.

2. An apparatus for continuously producing cheese curd, wherein said apparatus comprises a warm water bath to which a constant amount of water kept at a fixed temperature is supplied, and a nozzle having a discharge port positioned at its lower end for sprinkling and pouring condensed milk, said nozzle being positioned in the vicinity of the liquid surface in the warm bath and being equipped with a discharge port having multiple holes so as to sprinkle and pour the condensed milk in the shape of thin membranes or strings.

3. The apparatus for continuously producing cheese curd according to claim 2, in which the warm water bath is equipped with a plural number of feeding ports for introducing warm water from the periphery toward the central zone for converting the condensed milk sprinkled and poured from the nozzle into curd by clotting, the apparatus being equipped with a discharge port for discharging the curd and warm water.

4. The apparatus for continuously producing cheese curd according to claim 2, equiped with a liquid level sensor for measuring the level of the water surface in the warm water bath and a controlling device to control, utilizing the value obtained from the sensor, the discharge amount of the curd and warm water by discharge means located at the dischage port, thereby positioning the end of the nozzle for sprinkling and pouring the protein solution 1–5 centimeters above the water surface in the warm water bath.

5. The apparatus for continuously producing cheese curd according to claim 2, in which at least one of cooling means or insulating means is equipped in the surroundings of the discharge port of the nozzle for sprinkling and pouring the protein solution.

6. A continuous process for producing a curd from milk comprising:

(1) concentrating the milk;

(2) cooling the concentrated milk to a temperature at least below 10° C.;

(3) adjusting the pH of the milk to about 4.8 to 5.8;

(4) forming the concentrated milk into a plurality of individual streams by means of a nozzle equipped with a discharge port having multiple holes;

(5) flowing said streams into a water bath having a predetermined water level and maintained at a temperature between about 45° C. to 95° C.;

(6) maintaining the temperature and predetermined level of the water bath by addition of water to the water bath; and (7) removing curd formed from the milk from a bottom portion of the water bath.

* * * * *